United States Patent
Wang

(10) Patent No.: US 7,057,601 B2
(45) Date of Patent: Jun. 6, 2006

(54) THIN POINTING APPARATUS

(76) Inventor: Hsi-Chen Wang, 11F-1, 236, Fu-Hsing S. RD., Sec. 2, Taipei, 106 (TW)

( * ) Notice: Subject to any disclaimer, the term of this patent is extended or adjusted under 35 U.S.C. 154(b) by 463 days.

(21) Appl. No.: 10/642,831

(22) Filed: Aug. 19, 2003

(65) Prior Publication Data

US 2004/0046738 A1    Mar. 11, 2004

(30) Foreign Application Priority Data

Aug. 22, 2002    (TW) .............................. 91118955 A

(51) Int. Cl.
*G09G 5/00* (2006.01)
(52) U.S. Cl. ..................... 345/156; 345/157; 345/163
(58) Field of Classification Search ......... 345/156–184
See application file for complete search history.

(56) References Cited

U.S. PATENT DOCUMENTS 6,332,840 B1 *  12/2001  Nishiumi et al. ............. 463/38
6,717,572 B1 *   4/2004  Chou et al. ................. 345/157
2004/0233159 A1 *  11/2004  Badameh ..................... 345/156

* cited by examiner

*Primary Examiner*—Sumati Lefkowitz
*Assistant Examiner*—Rodney Amadiz
(74) *Attorney, Agent, or Firm*—Troxell Law Office, PLLC

(57) ABSTRACT

A thin pointing apparatus includes a base associated with a circuit board and pivotally connecting with a rotary disk. The circuit board joins six conductive annular rails, three photo-interrupters and a microprocessor. The rotary disk is provided with four conductive plates corresponding to the annular rails disposed underneath such that the user can press down the conductive plates to touch any two neighboring annular rails for changing the moving direction of the cursor quickly. The rotary disk further provides the photo interruption sets. Two photo-interrupters are disposed under the first photo interruption set for detecting the rotational direction and rotational displacement of the rotary disk. The third photo-interrupter is disposed under the second photo interruption set for detecting the absolute rotational angle of the rotary disk. The pointing apparatus is capable of attaching with a USB to perform the function of USB hub additionally.

20 Claims, 6 Drawing Sheets

006
THIN POINTING APPARATUS

BACKGROUND OF THE INVENTION

1. Field of the Invention

The present invention relates to a device to control the moving direction and displacement of the cursor on a screen, and particularly to a cursor pointing apparatus with a thinner structure.

2. Description of Related Art

A mouse is one of the main input tools of a computer for controlling movement of the cursor on a screen. Because the mouse for a notebook computer has a bigger size comparatively, it is improper for the mouse to be an integrated part of the notebook computer. Hence, mostly, the touch pad is utilized as the input device in the notebook computer instead of the mouse but it is quite inconvenient for operating the touch pad so that it is often to be touched carelessly by the user easily and leads to a phenomenon of cursor moving up and down unstably. Taiwanese Patent No. 112874, which has been to the present applicant, discloses a pointing device and the pointing device includes a Angular control part and a displacement control part. The Angular control part and the displacement control part give the moving object a direction value and a displacement value respectively and the direction value and the displacement value can be operated with a single chip controller to figure out the coordinate values continuously for the moving object being controlled to reach a position corresponding to the coordinates' and the users don't need to move their wrist to and fro for pointing direction, they only press to go and release to stop and turn the angular wheel (rotary disk) to aim to different direction and then press to go to other direction, and the pointing device just stay at the same place like touch pad, doesn't need spared operation space.

SUMMARY OF THE INVENTION

The crux of the present invention is to provide a thin pointing apparatus, which is much easier and quicker to change the moving direction of the cursor inversely, much more accurate to control the moving position of cursor and much thinner in structure thereof with an additional function of hub having a USB socket.

Accordingly, a primary object of the present invention is to provide a pointing apparatus with a thinner structure.

Another object of the present invention is to provide a pointing apparatus, which is capable of changing the moving direction of the cursor inversely.

A further object of the present invention is to provide a pointing apparatus, which is possible to control the moving position of the cursor accurately.

A further object of the present invention is to provide a pointing apparatus, which has a function of USB hub additionally.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
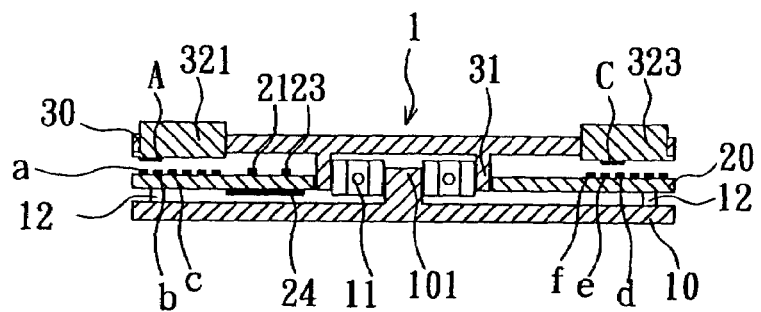
FIG. 1 is a sectional view of a thin pointing apparatus according to the present invention.
Figure 2:
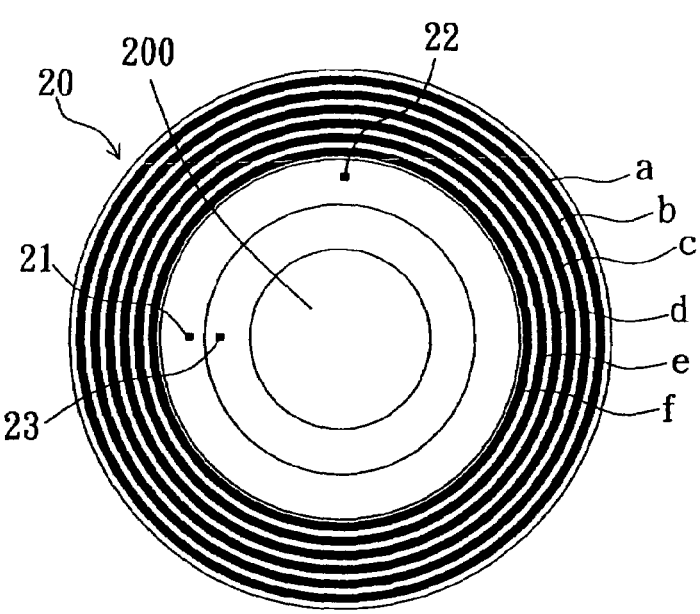
FIG. 2 is a top view of a circuit board in the thin pointing apparatus of the present invention.
Figure 3:
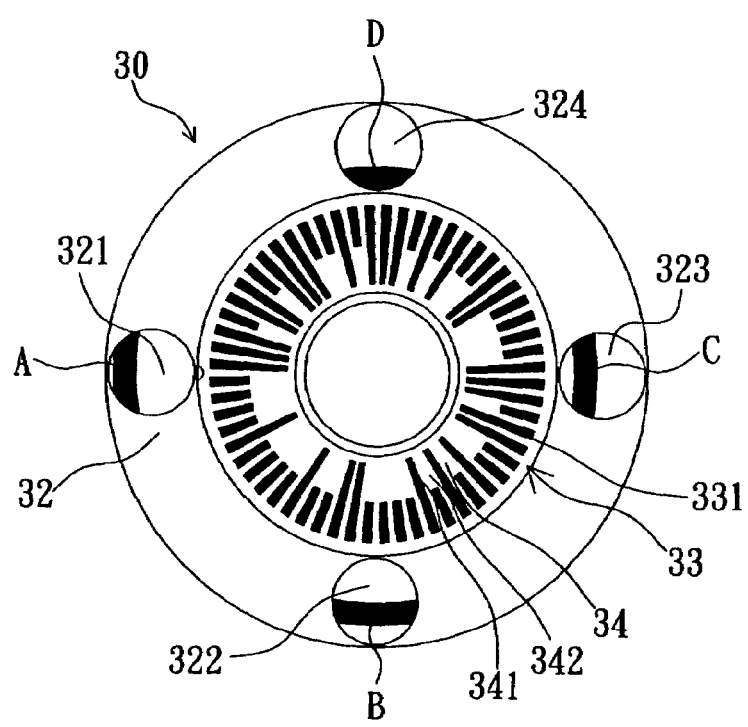
FIG. 3 is a bottom view of a rotary disk in the thin pointing apparatus of the present invention.

Referring to FIGS. 1, 2 and 3, a thin pointing apparatus includes a base 10 associated with a circuit board 20 and a rotary disk 30. The base 10 extends a jut post 101 with a bearing 11 and the bearing at the outer wall thereof connects with a pivot part 31 of the rotary disk 30 so that the base can pivotally connect with the rotary disk 30. The base 10 is joined to the circuit board 20 with several support posts 12 and the circuit board 12 at the central spot thereof has a hole 200 for being passed by the base 10 and the pivot part 31. The circuit board 20 is associated with six conductive annular rails (a, c, d, and f), three photo-interrupters (21, 22 and 23) and a microprocessor 24 sequentially. The annular rails (a, b, c, d, e and f) and the photo-interrupters (21, 22 and 23) are connected to the circuit board 20 respectively. The rotary disk 30 at the lower side thereof joins an elastic ring plate 32 and the elastic ring plate 32 has four press buttons 321, 322, 323 and 324 spacing 90° apart from each other. The press buttons 321, 322, 323 and 324 at upper ends thereof extend outward a hole provided in the rotary disk 30 and at the lower ends thereof corresponding to the annular rails (a, b), (b, c), (d, e) and (e, f) disposed underneath so as to join with conductive plates A, B, C and D. When the user presses any one of the buttons 321, 322, 323 and 324, the conductive plates can touch two annular rails corresponding to the pressed button. When the pressed button is released, the conductive plates then move back to the original positions thereof due to the resilient force of the elastic ring plate 32. The elastic ring plate 32 can be made of silicon rubber and the conductive plate can be made of metal or conductive rubber. The rotary disk 30 further has been annularly arranged with a first photo-interrupter set 33 and a second photo-interrupter set 34. The first photo-interrupter set 33 has a plurality of first recesses 331, which are equidistantly spaced apart corresponding to the photo-interrupters 21, 22 disposed underneath. The second photo-interrupter set 34 includes a plurality of second recesses 341 and non-recess parts 342 with binary code arrangement corresponding to the photo-interrupter 23 underneath.

Figure 4:
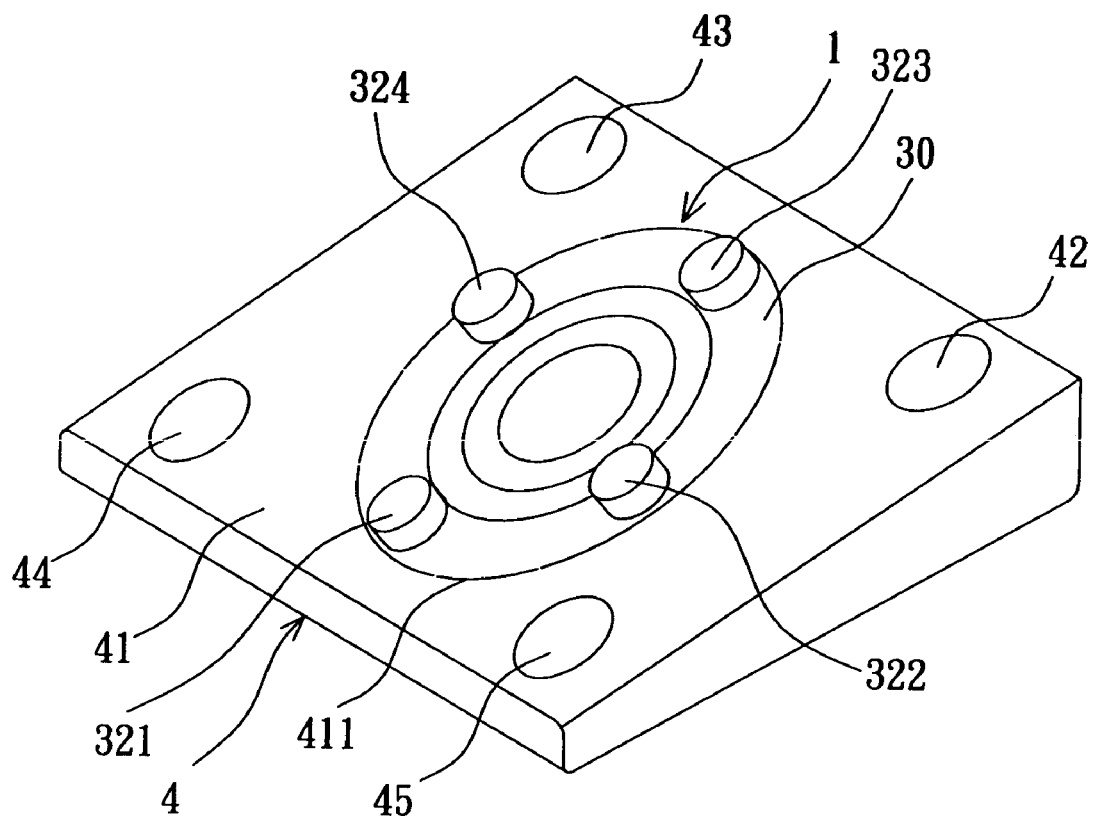
FIG. 4 is a perspective view of the thin pointing apparatus of the present invention being associated with a USB hub.

Referring to FIG. 4, the USB hub 4 of the present invention has a case 41 with the upper end thereof having a hole 411 for receiving the rotary disk 30 of the pointing apparatus. Both the base and the circuit board thereof are arranged in the case 41 and the press buttons 42, 43, 44 and 44 are attached to the case 41 too.

Figure 5:
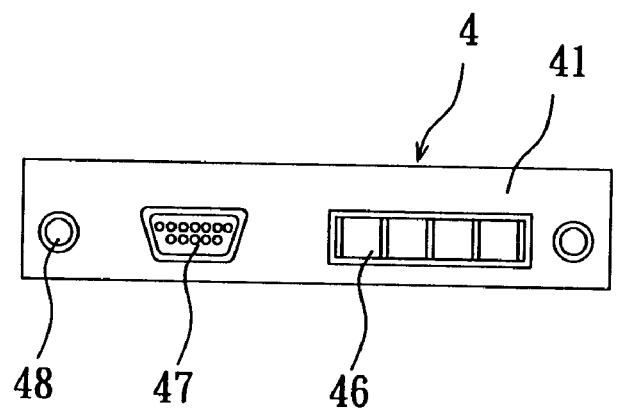
FIG. 5 is a rear view of the thin pointing apparatus of the present invention being associated with a USB hub.
Figure 6:
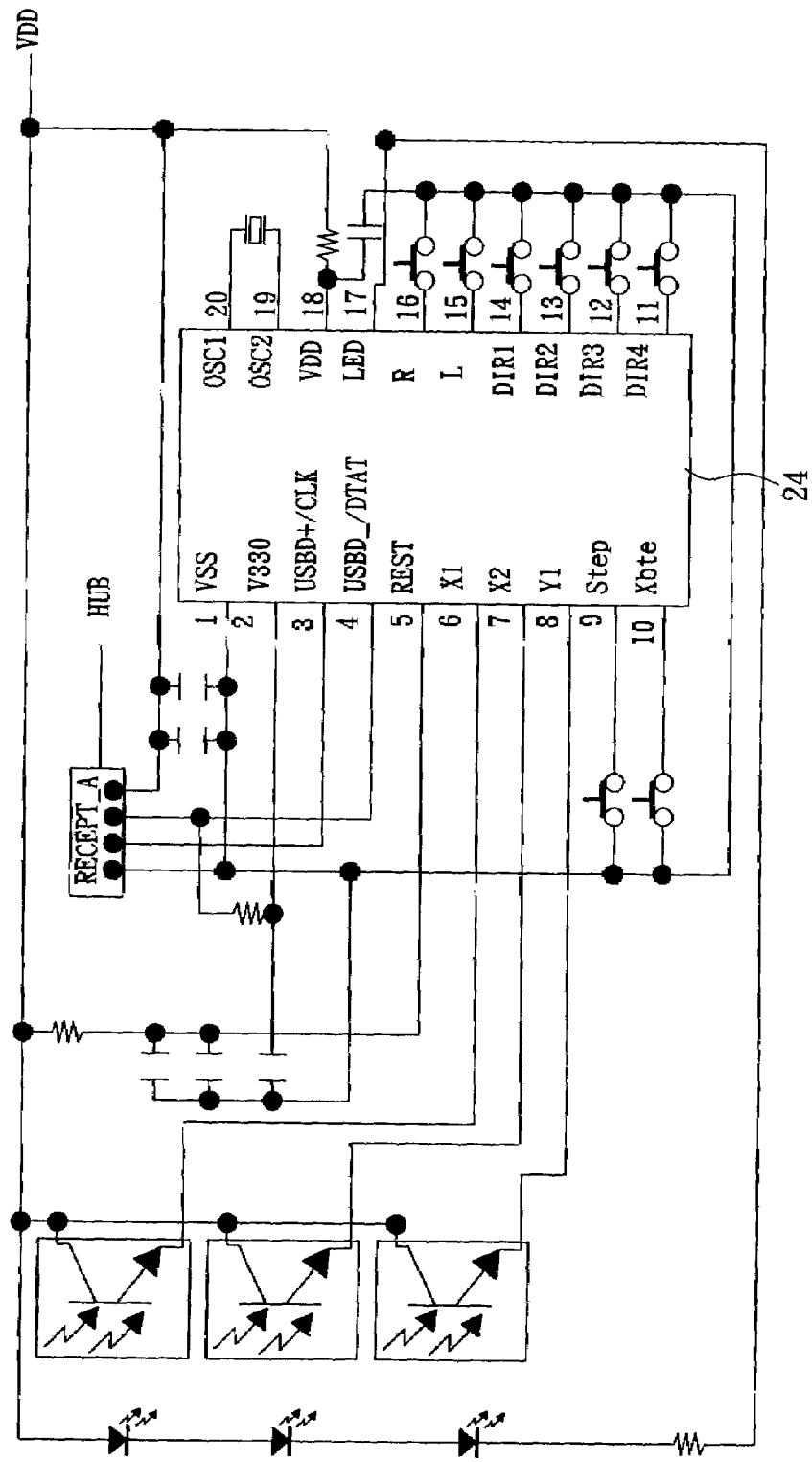
FIG. 6 is a circuit diagram of the present invention.

Referring to FIG. 5, the USB hub 4 at the rear side of the case 41 is provided with a plurality of USB sockets 46, an outlet of a signal connector 47 and a power socket 48.

Referring to FIGS. 1, 2, 3, 4 and 6, the circuit structure mainly includes a microprocessor 24 and the microprocessor 24 has pin legs 11, 12, 13 and 14 thereof being connected to the annular rails a, b, c, d and f respectively as shown in FIGS. 1 and 2, pin legs 9, 10, 15 and 16 thereof being connected to the four press buttons 42, 43, 44, 44 and 45 on the case 41 respectively, pin legs 6, 7 and 8 thereof connected to the photo-interrupters 21, 22 and 23 respectively and pins 1, 2, 3 and 18 thereof being connected to the hub 4 respectively. Further, the annular rails b and e are grounded.

Referring to FIGS. 1, 2, 3, 4 and 6 again, the microprocessor 24 detects signals transmitted via components connected to it. Once the user presses the buttons 321, 322, 323 and 324 on the rotary disk 30, the conductive plates A, B, c and D can contact the annular rails (a, b), (b, c), (d, e) and (e, f) respectively and the microprocessor 24 then can decide which quadrant the press point is in and controls the cursor to move as soon as the conductive signal has been detected by the microprocessor 24. Meanwhile, the user turns the rotary disk at the same time and actuates the two photo-interrupters 21, 22 to transmit the detecting signals to the microprocessor 24 such that the microprocessor 24 can control the cursor to rotate an angle corresponding to the turned angle of the rotary disk or an angle proportional to the turned angle of the rotary disk. Hence, any one of the buttons 321, 322, 323 and 324 is pressed in company with the rotary disk 30 being turned, the movement path of the cursor can be controlled. If the cursor is desired to move rectilinearly, the only operation, which has to be done, is to press any one of the buttons 321, 322, 323 and 324 without turning the rotary disk 30. If the moving direction of the cursor is desired to change 90°, 180° or 270°, any one of the buttons 321, 322, 323 and 324 corresponding to 90°, 180° or 270° can be pressed down interchangeably with the rotary disk 30 being turned at the same time. Hence, the moving direction of the cursor can be changed quickly.

Figure 7:
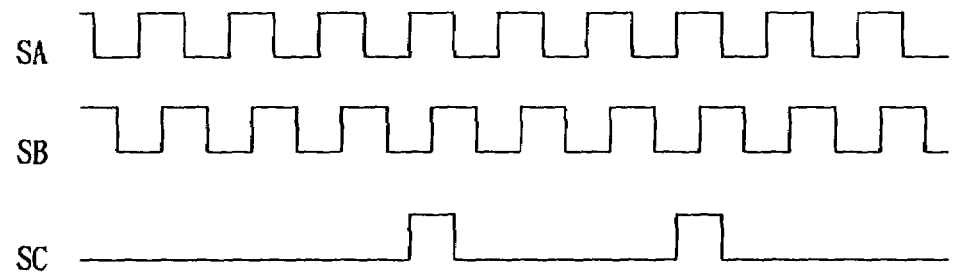
FIG. 7 is a schematic diagram of illustrating a first embodiment with regard to a signal detected with a photo-interrupter while the thin pointing apparatus of the present invention is in use.
Figure 8:
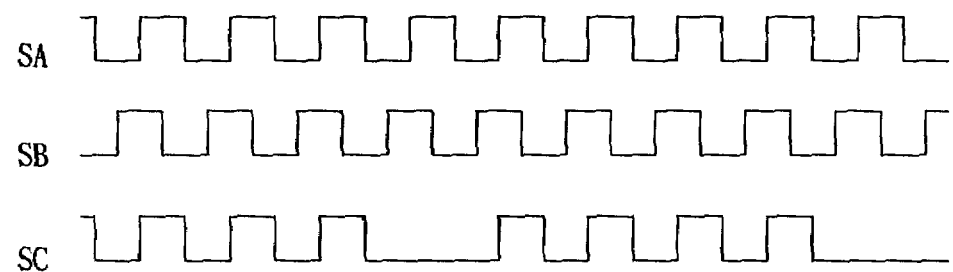
FIG. 8 is a schematic diagram of a second embodiment with regard to a signal detected with a photo-interrupter while the thin pointing apparatus of the present invention is in use.
Figure 9:
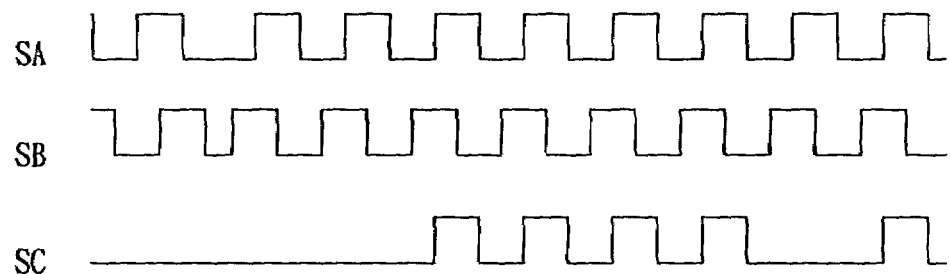
FIG. 9 is a schematic diagram of a third embodiment with regard to a signal detected with a photo-interrupter while the thin pointing apparatus of the present invention is in use.

Referring to FIGS. 2 and 3 again, while the thin pointing apparatus of the present invention is in use, the first photo interruption set 33 is detected by way of the first and the second photo interrupters 21, 22 to ensure the rotational displacement and the rotational direction of the rotary disk 30. As shown in FIGS. 7 and 8, the SA curve represents variation value of the photo interrupter 21, the SB curve represents variation vale of the photo interrupter 22, low positions in the curves mean the locations of the first set of recesses 331 have been detected, and high positions in the curve mean the locations of flat planes have been detected. FIG. 7 illustrates the first recess sets 331 are detected by the photo interrupter 21 before being detected by the photo interrupter 22 and clockwise rotation of the rotary disk 30 can be obtained. Contrarily, FIG. 8 illustrates the first recess sets 331 are detected by the photo interrupter 21 after being detected by the photo interrupter 22 and counterclockwise rotation of the rotary disk 30 can be obtained. FIG. 9 illustrates the first recess sets 331 are detected by the photo interrupter 21 first, then by the photo interrupter 22 first and finally by the photo interrupter 21 first further and this acknowledges the rotary disk 30 rotates clockwise and then counterclockwise. Hence, the rotational displacement of the rotary disk 30 can be figured out by way of the number of the first recess sets 331 passing through the first and the second photo interrupters 21, 22.

Referring to FIGS. 2, 3, 7, 8 and 9 again, variation of SC curve can be obtained in case of using the photo interrupter 23 detecting the second photo interruption set. The low position of the SC curve means the location of the second recess sets 341 having been detected by the photo interrupter 23 already. The photo interrupter 23 reads arrangement codes of the second photo interruption set 34 corresponding to the photo interrupter 21 reading eight gaps of the first recess sets 331 along the same direction as 00010010 shown in FIG. 7 or 1110111 shown in FIG. 8. Hence, the initial position of the photo interrupter 23 corresponding to the rotary disk 30 starting running can be obtained while the arrangement codes are compared to the arrangement code of each known position. For example, the arrangement codes of the second photo interruption set 34 detected by the photo interrupter 23 is 01001101 such that the first four codes 0100 can be compared to corresponding recesses of the first recess sets 331 to obtain the $3^{rd}$, the $6^{th}$, the $13^{th}$ and the $32^{nd}$ first recess sets 331 and the last four codes 1101 are compared so as to know the $32^{nd}$ first recess set 331 being disposed over the outside of the photo interrupter 23 during the rotary disk starting turning. In this way, the absolute angular position of the rotary disk 30 before turning can be obtained. When the rotary disk is turned further the actual rotating direction of the rotary disk 30 can be detected by the photo interrupters 21, 22 and the absolute coordinates of the rotary disk 30 after turning can be figured out by way of the number of the first recess sets passing through the photo interrupters 21, 22.

The photo interruption stripes in the present invention are made of the recesses and can be composed of black and white alternate stripes or light penetrable stripes as long as they are possible to be distinguished and read by the photo interrupters.

The first recess sets in the first photo interruption set disclosed in the present invention are possible to be adjusted with the number thereof depending on the required accurateness and the available arranged space. For instance, the number of the first recess sets can be 64. The second recess sets and non-recess parts in the second photo interruption set can be arranged with other encoding way, if any. For example, in case of an encoding way, which has five pieces as a group with continuous binary codes, the rotary disk is turned an angle in the same direction for the photo interrupters being able to read the arrangement codes and comparing to the known arrangement codes such that the absolute angular displacement prior to the rotary disk turning can be obtained.

Referring to FIGS. 1, 2 and 4 again, the switch buttons 44, 45 can be such as the left and the right buttons of a mouse, the switch button 43 can be a control key for rolling the window on a screen and the switch button 42 can be a micro adjustment key for controlling the cursor movement.

While the control key for rolling the window is in use, one finger presses the switch button 43 and another finger presses buttons over any two corresponding conductive plates (A, B) or (B, D) to roll up and down the window on the screen.

While the conventional mouse is in use, it is often to occur a phenomenon of being overdone or falling short of need in case of the mouse being micro-adjusted to a designated pixel position. For instance, the position (X=200, Y=199) being moved to the position (X=200, Y=200) and this kind of requisition is frequently met during drawing sketch so that the user wastes a lot of time in dealing with moving the position. In order to overcome the shortcoming, a switch button 42 is added for micro-adjusting the cursor so that the switch button 42 being pressed and then any one of buttons over the conductive plates A, B, C and D being pressed down result in the cursor moving forward along a specific direction. Under this circumstance, the micro-adjustment can be performed easily by way of simply clicking several times and it largely improve the deficiency with regard to the mouse being hard to operate the cursor with a very tiny movement value.

Figure 10:
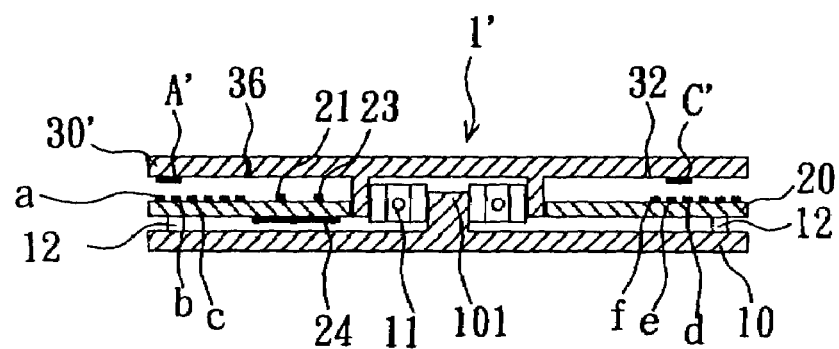
FIG. 10 is a sectional view of the thin pointing apparatus of the present invention in a second embodiment thereof.
Figure 11:
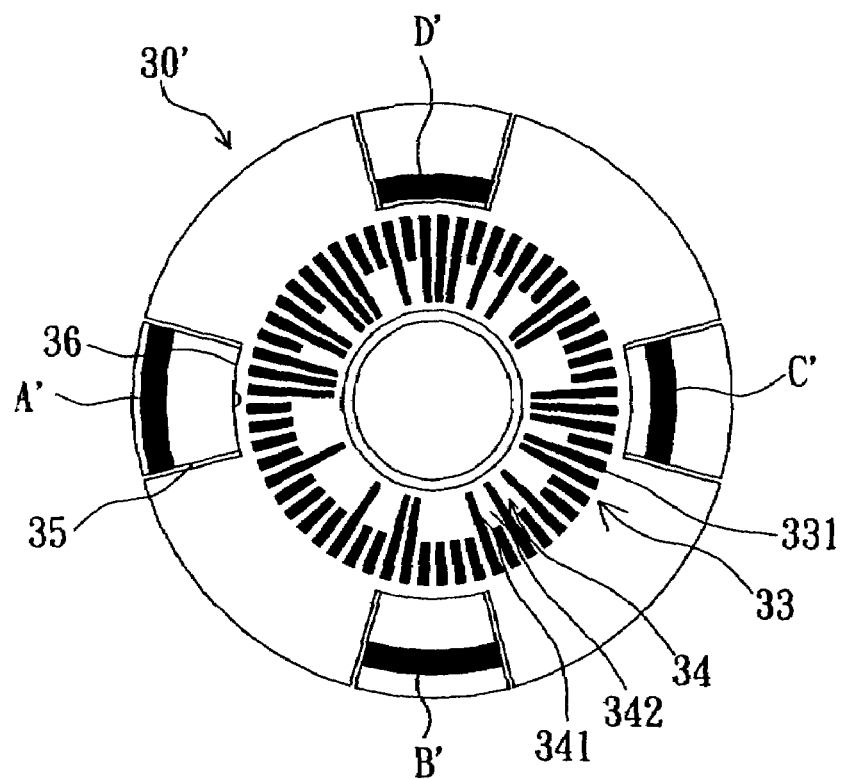
FIG. 11 is a bottom view of another embodiment of the rotary disk in the thin pointing apparatus of the present invention.

Referring to FIGS. 10 and 11, another embodiment of thin pointing apparatus 1', especially modification of the rotary disk 30 shown in FIGS. 1 and 3. The rotary disk 30' at the lower side thereof provides four conductive plates A', B', C' and D', which space apart 90° from each other corresponding to the annular rails (a, b), (b, c), (d, e) and (e, f) underneath. The rotary disk 30' at both sides of the conductive plates has slits 35 and every two slits 35 at the lower sides thereof communicating with a flute 36 so as to prevent rest parts of the rotary disk 30' from bowing downward while the user presses any one of the conductive plates to touch the annular rails.

Figure 12:
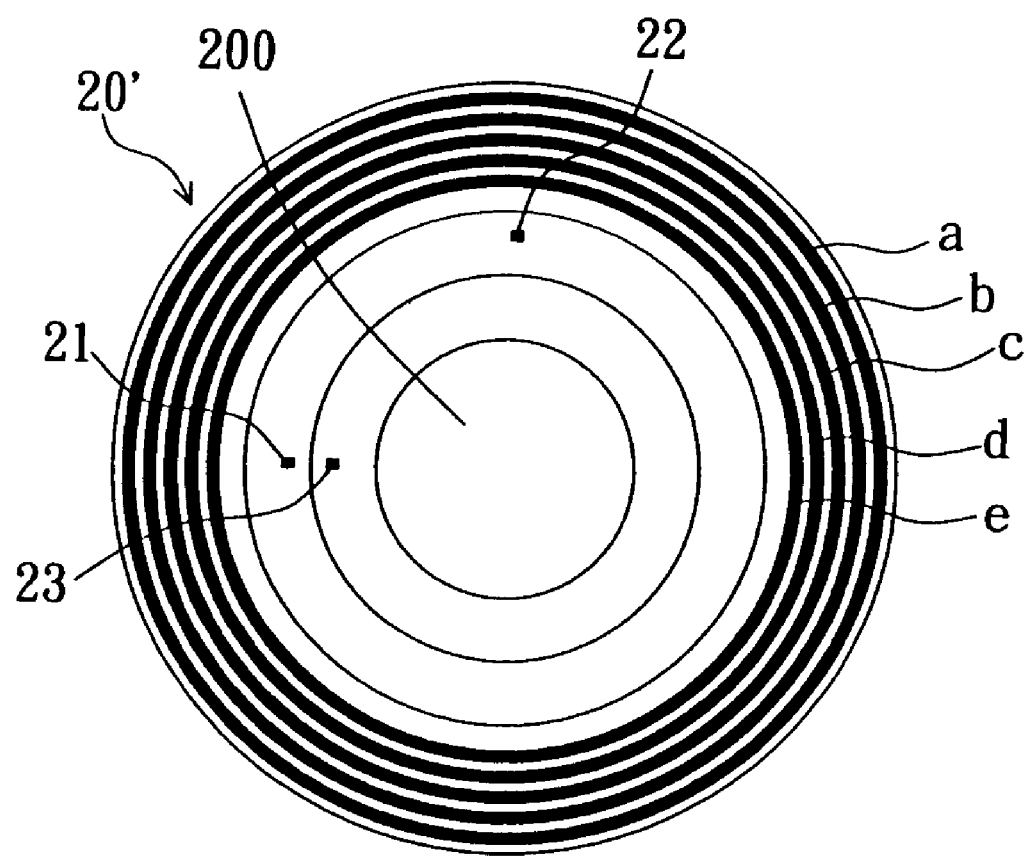
FIG. 12 is a top view of another embodiment of the circuit board in the thin pointing apparatus of the present invention.

Referring to FIG. 12, the circuit board 20' can be provided with five annular rails a, b, c, d, e or three annular rails a, b, c and allows the four 90° apart conductive plates or the two 180° apart conductive plates to touch two neighboring annular rails. Hence, once the two annular rails have been detected by the microprocessor, it is capable of deciding which quadrant the press point exerted by the user is in.

While the invention has been described with reference to the preferred embodiments thereof, it is to be understood that modifications or variations may be easily made without departing from the spirit of this invention which is defined by the appended claims.

What is claimed is:

1. A thin pointing apparatus, comprising:
   a base;
   a rotary disk, being pivotally connected to the base and forming a pivotal connecting part; and
   a circuit board, being associated with the base with a central hole thereof being passed through by the pivotal connecting part; wherein
   the circuit board further comprises
   a microprocessor;
   at least two conductive annular rails, being arranged sequentially and connected to the microprocessor; and
   two photo-interrupters, being connected to the microprocessor; and
   the rotary disk further comprises
   at least one conductive plate, being disposed at a lower side of the rotary disk and the at least one conductive plate spacing apart an equivalent angle each other corresponding to the annular rails, which are disposed underneath the rotary disk, being able to touch the two conductive annular rails during being pressed by a user from an upper side thereof; and
   a first photo interruption set, being arranged annularly with a plurality of equidistant photo interrupting stripes and the photo interrupting stripes being above and corresponding to the two photo-interrupters.

2. The thin pointing apparatus according to claim 1, wherein the rotary disk at the lower side thereof provides four conductive plates spacing 90° apart from each other.

3. The thin pointing apparatus according to claim 1, wherein rotary disk at the lower side thereof is attached with an elastic ring plate, the elastic ring plate being provided with at least a press button equiangular spaced apart each other and the at least press button piercing a hole arranged in the rotary disk with the press button at a lower end thereof being joined to the conductive plate respectively.

4. The thin pointing apparatus according to claim 1, wherein the rotary disk provides slits at both lateral sides of the conductive plates respectively and the two slits at lower ends thereof communicate with each other by a flute so that the conductive plates touch the annular rails respectively only not to influence rest parts of the rotary disk as soon as the user presses down the conductive plates.

5. The thin pointing apparatus according to claim 1, wherein the circuit board is associated with another photo-interrupter; the rotary disk further has a second interruption set arranged annularly and the second interruption set includes a plurality of second photo interruption stripes and non-stripe parts arranged with binary codes; and the second photo interruption set is above and corresponding to another photo-interrupter.

6. The thin pointing apparatus according to claim 1, wherein the rotary disk is received in an upper hole of a case and the base with the circuit board is disposed in the case; and the case further joins with at least two switch buttons, which are connected to the microprocessor with lead wires.

7. The thin pointing apparatus according to claim 3, wherein the circuit board is associated with five conductive annular rails.

8. The thin pointing apparatus according to claim 3, wherein the circuit board joins six conductive annular rails.

9. The thin pointing apparatus according to claim 7, wherein each of the photo interruption stripes in the second photo-interruption set has the same angular arrangement as one of the photo interruption stripes in the first interruption set.

10. The thin pointing apparatus according to claim 6, wherein the case is a USB hub with a USB socket at a back thereof.

11. The thin pointing apparatus according to claim 6, wherein one of the switch buttons is a micro-adjustment button for a cursor.

12. The thin pointing apparatus according to claim 6, wherein one of the switch buttons is a control button for rolling a window on a screen.

13. The thin pointing apparatus according to claim 8, wherein the second and the fifth ones of the six conductive annular rails are grounded respectively.

14. The thin pointing apparatus according to claim 9, wherein the second interruption set is disposed at an inner side of the first interruption set.

15. The thin pointing apparatus according to claim 9, wherein the first photo interruption set has 60 recesses.

16. The thin pointing apparatus according to claim 9, wherein the second photo interruption set has second photo interruption stripe sets being designated as 0 and the non-recess parts have four stripes and are designated as 1 with an arrangement of continuous binary codes.

17. The thin pointing apparatus according to claim 13, wherein the rotary disk is received in an upper hole of a case and the base with the circuit board is disposed in the case; and the case further joins with at least two switch buttons, which are connected to the microprocessor with lead wires.

18. The thin pointing apparatus according to claim 17, wherein the case is a USB hub with a USB socket at a back thereof.

19. The thin pointing apparatus according to claim 17, wherein the circuit board is associated with another photo-interrupter; the rotary disk further has second interruption set arranged annularly and the second interruption set includes a plurality of second photo-interruption stripes and non-recess parts arranged with binary codes; and the second photo interruption set is disposed over and corresponding to another photo-interrupter.

20. The thin pointing apparatus according to claim 19, wherein each of the photo interruption stripes in the second photo-interruption set has the same angular arrangement as one of the photo interruption stripes in the first interruption set.

* * * * *